July 18, 1944.   L. R. LUDWIG ET AL   2,354,134
CIRCUIT INTERRUPTER
Filed Nov. 5, 1941

WITNESSES:
N. F. Susser
G. T. Stratton

INVENTORS
Leon R. Ludwig and
Paul O. Langguth.
BY Ralph H. Swingle
ATTORNEY

Patented July 18, 1944

2,354,134

UNITED STATES PATENT OFFICE 2,354,134

CIRCUIT INTERRUPTER

Leon R. Ludwig and Paul O. Langguth, Wilkinsburg, Pa., assignors to Westinghouse Electric & Manufacturing Company, East Pittsburgh, Pa., a corporation of Pennsylvania Application November 5, 1941, Serial No. 417,908

5 Claims. (Cl. 200—131)

This invention relates in general to electric circuit interrupting devices, and more particularly to interrupters of the fusible type adapted to interrupt very large amounts of current without any external display.

With the development in recent years of network distribution systems, it has become desirable to provide some means to prevent damage to sections of cable adjacent to or connected with the cable section in which the fault occurs. It is common practice in network systems to allow faults in any cable section to burn themselves clear, and the cable is of a size to carry heavy overload and short circuit currents for short times without damage. There are, however, many types of faults which are not self-clearing in short periods of time, and which may, therefore, cause extensive damage if allowed to persist. Therefore, in order to prevent such damage, it has been suggested that a limiting device in the nature of a fuse be provided for each cable section, preferably with such a limiting device at each end of a cable section, and with the limiting device being coordinated with the cable so as to interrupt the circuit on overloads or short circuits which would be great enough to heat the insulation of adjacent and interconnected cable sections to a point which would cause permanent damage. This type of fault occurs relatively infrequently and the expense of installing replaceable fuses of the ordinary high current type would be prohibitive.

Because these limiting devices are desired for the protection of cable they should have a continuous current carrying rating identical with that of the cable, and should not interrupt the circuit on ordinary overloads which the ordinary fuse is designed to protect; that is, on currents ranging from fractional ampere ratings up to a few hundred amperes. Accordingly, a limiting device of the type described, should be capable of interrupting currents ranging from a minimum of one or two thousand amperes on low voltage networks (110-208 volts) to as high as seventy-five thousand amperes on six hundred volt networks.

Another requirement of network limiting devices is that they be totally enclosed, preferably forming an integral part of the network cable, and that they be capable of interrupting the circuit without any external display. This is because the cables are usually installed underground where dampness or explosive atmosphere may be encountered, or, in the newly developed high voltage networks for industrial application, the installation is usually indoors where safety requirements are more rigid.

Heretofore, circuit interrupters employing fusible elements for interrupting the circuit in response to currents above a predetermined value, have been designed for overload protection of apparatus in the circuit, rather than for the protection of cable insulation; therefore, as stated above, these prior art devices act to interrupt the circuit at much lower current values and have much lower interrupting capacity than is desired in a network limiting device.

In the copending application of J. M. Wallace, Serial No. 257,879, filed February 23, 1939, now Patent No. 2,259,946, issued October 21, 1941, and assigned to the same assignee as this invention, there is disclosed and claimed a fuse of the power type which represents an extreme in interrupting capacity of the ordinary type fuse. The fuse of Wallace is an expulsion type fuse which relies for interruption upon attenuation of the arc while subjecting it to a blast of un-ionized gases evolved by the action of the arc on the walls of the arc chamber, and these gases are projected out of an open end of the fuse. Wallace's fuse obviously would not fulfill all the above-mentioned requirements for a network limiting device.

With the foregoing problem in mind, one object of this invention is to provide a novel circuit interrupting device capable of interrupting high values of current without external display.

Another object of this invention is to provide a novel circuit interrupting device in the nature of a fuse which is capable of interrupting high values of current.

Another object of this invention is to provide a novel construction of a circuit interrupter which is capable of interrupting large amounts of current, but which is relatively simple in structure and economical to manufacture.

Still another object of this invention is to provide a circuit interrupting device capable of extinguishing high current arcs by the provision of a high voltage drop across the arc in a novel manner.

These and other objects of this invention will become more apparent upon consideration of the following description of preferred embodiments thereof, when taken in connection with the attached drawing, in which.

Figure 1:
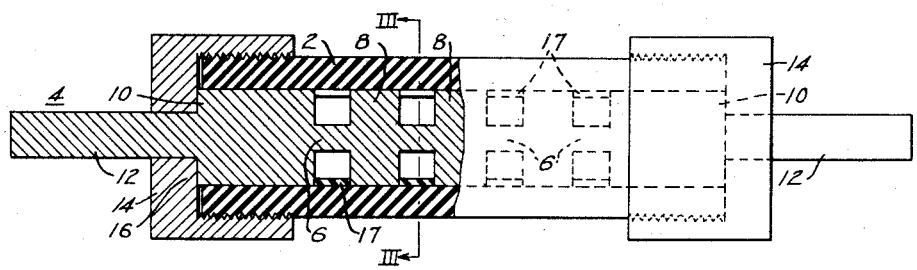
Figure 1 is a side elevational view partially in section of a network limiting device constructed in accordance with this invention.
Figure 3:
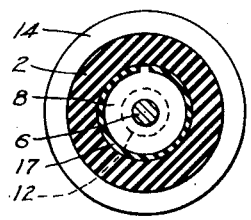
Fig. 3 is a transverse sectional view taken substantially on the line III—III of Fig. 1.

As previously stated, one of the requirements of a limiting device for networks of the type described, is that the device be entirely enclosed when interruption occurs, so that there is no external display. In the embodiment of the invention shown in Fig. 1, the enclosure for the limiting device includes a relatively thick walled insulating tube 2, which may be of fiber or other insulating material which will have sufficient strength to withstand pressures of the order of 1,000 pounds per square inch. A unitary conducting bar 4 is adapted to be positioned within the tube 2, and this bar is preferably formed from a single piece of conducting material preferably having the characteristics hereinafter referred to. Conducting bar 4, as shown in Fig. 1, is provided with a plurality of intermediate spaced portions 6 reduced in cross section to form fusible sections adapted to be melted on currents predetermined by the insulation characteristics of the network cable to be protected. Intermediate each reduced section 6, there is provided a section 8 of enlarged cross section forming partitions for dividing tube 2 into a plurality of separate and independent arcing chambers. Adjacent the ends of tube 2, conducting member 4 is provided with relatively large portions 10 of a cross section which is the same as that of partitions 8, to form end closures for the tube, and also to provide shoulders 16 at the outer ends of portions 10 for cooperation with end caps 14. The end caps 14 are each provided with a substantially central aperture for receiving a terminal portion 12 of conductor 4. The terminals 12 of conductor 4 are preferably of a round cross section larger than fusible section 6, but smaller than partition and end sections 8 and 10. End closure caps 14 are adapted to be threadedly engaged with the outer ends of insulating tube 2 so that they may be tightly screwed up against shoulders 16 on conductor 4, to provide a complete and tight enclosure for the device. It will be noted that insulating spacer rings 17 are provided between partition sections 8 and between the end partition sections and enlarged portions 10, to maintain the spacing of these sections after the fusible sections 6 have melted. These spacer rings 17 may be split as shown in Fig. 3 to facilitate applying them over fusible sections 6.

It will be noted that the clamping action of the end caps 14 in cooperation with shoulders 16 on conductor rod 4, and with insulating tube 2, provides an especially rugged yet simplified enclosure for fusible section 6. In the interruption of large current arcs, for example, arcs of 20,000 amperes or above, it is obvious that such an arc may be extinguished in the open air or in so-called expulsion interrupting devices provided the arc is drawn out a sufficient length. With arcs in such devices, in order that they may be prevented from restriking after current zero, it is necessary that the arc voltage made up of the cathode drop and the voltage required to maintain the positive column of the arc be a definite value, depending upon the current to be interrupted and the voltage applied. For currents of the order of 20,000 amperes or higher, it is obvious that such structures would necessarily be so large and present such difficulties in manufacture as to be impractical to use, especially for the purpose of protecting network cables, where a great many would be required. Similarly, if several fusible sections in series be provided in the open air or in partial enclosures, the cathode drop of the several sections could obviously be made high enough to prevent the arc from reestablishing itself after current zero if enough series arcs are provided. However, such a structure would also be very large and cumbersome and consequently impractical for this application.

With the construction illustrated in Fig. 1, it is possible to interrupt such high currents in the relatively small and simplified construction illustrated. On overloads, the fusible sections 6 will melt, and arcs will be drawn between partition sections 8 and between the end partition sections and enlarged end portions 105. Here, as in the case of fusible sections melting in the open air or merely in partial enclosures, the voltage drop available for the purpose of preventing restriking of the arc after current zero, comprises the sum of the cathode drops and the voltage required to maintain the positive column of the arc of the several arcs, shown in this instance as four in number. It will now be noted that by providing a total enclosure about each arc section, that as soon as a fusible section 6 melts, a pressure will be developed in its arc chamber, and since this pressure cannot escape, it will act on the positive column of the arc to produce a very much larger voltage drop throughout the positive column than would be otherwise produced. Accordingly, the voltage drop available in the fuse shown in Fig. 1 comprises the combination of the high voltage drop of the positive column and the cathode drop furnished by the several arcs in series. This has been found to be great enough to cause circuit interruption after the first or second current zero on the high currents previously mentioned.

If fusible sections 6 should melt just before a current zero, the fuse may not interrupt because the pressure has not attained a high enough value to cause the positive column voltage to become high enough to interrupt the circuit. However, the fuse will interrupt after the second current zero, because the pressure has then had time enough to build up enough voltage in the positive column of the arc to cause interruption. It is also important to note that by the provision of series arcs, the pressure is distributed along insulating case 2, so that the pressure at any part will not be as great as the highest pressure which would be developed if only a single arc were used.

Another important aspect of the invention resides in the particular material comprising conducting rod 4. One well known theory with respect to maintaining an arc, is that there must exist a cathode having a temperature high enough to emit electrons. An arc cathode which operates in this manner is generally known as a hot cathode. More recently, it has been found that thermionically active cathodes are not absolutely necessary for the maintenance of an arc discharge, and that while frequently arc discharges operate with hot cathodes, it is also possible to maintain an arc discharge under conditions where the cathode is cold, that is, where the cathode has a temperature much below the temperature of electron emission. These two theories are set forth in the patent to Joseph Slepian, 1,784,760, issued December 9, 1930, and assigned to the same assignee as this invention.

The cold cathode arc theory assumes that the passage of current from the arc to the cathode is obtained by thermal ionization in a gas layer next to the cathode, rather than by thermionic electron supply from a hot cathode. In an arc with a hot cathode, it is obvious that the cathode will not have an opportunity to cool down below the temperature at which it emits electrons at the time of current zero, and consequently offers little resistance to the restriking of the arc after current zero. On the other hand, in an arc with a cold cathode, the ionized gas layer next to the cathode has an opportunity to become deionized to a substantial extent at current zero, so that considerable voltage is required to restrike an arc after current zero. Consequently, the cathode drop for an arc with a cold cathode is considerably greater than that with a hot cathode, the ratio being about 10 to 1.

One way of obtaining an arc with a cold cathode is described in the above-mentioned Slepian patent, and comprises moving the arc over the cathode sufficiently rapidly so that no point of the cathode surface is subjected to the heat of the arc long enough to acquire a high enough temperature to emit electrons.

This invention also contemplates the formation of arcs upon fusion of fusible section 6, which arcs have cold cathodes. Cold cathode arcs may be obtained in the embodiment of the invention shown in Fig. 1 by making conductor rod 4 of a cold cathode material. By a cold cathode material is meant those materials which melt at a temperature below the temperature at which electronic emission might occur. Examples of cold cathode materials are: zinc, aluminum, tin, lead and alloys thereof. The use of these materials as well as other materials which come within the above definition of cold cathode materials, is contemplated for conductor bar 4.

It will now be apparent, if conductor bar 4 is of a cold cathode material, that upon fusion of fusible sections 6, arcs will be struck between enlarged partition portions 8 and end portions 10, and that the arc electrodes will be of a cold cathode material.

From the foregoing, it is apparent that not only by the construction illustrated in Fig. 1 is it possible to obtain an unusually high voltage drop in the positive column of an arc, but that the cathode drop is also made to be very high so that the combined drops of each arc and of the several arcs will produce a very high resultant drop effective to extinguish very high current values, while at the same time the physical dimensions of the interrupter may be made relatively small. Thus in an interrupter capable of interrupting at least 25,000 amperes at 600 volts, the dimension of the interrupter may be less than 12 inches long and may be made but two or three inches in diameter.

The interrupter disclosed in Fig. 1 also differs from the ordinary type of fuse in that for the protection of network cable insulation, it should not operate to interrupt the circuit except at high values of current. Consequently, fusible sections 6 are relatively massive, and it is the vaporization of this relatively large mass of metal which produces the high pressure to increase the drop across the positive column of the arc.

Figure 2:
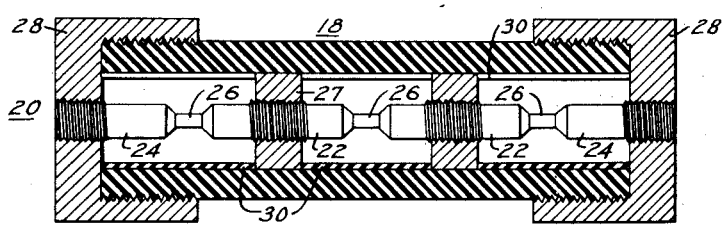
Fig. 2 is a longitudinal sectional view through a modified form of limiting device.

In the embodiment of the invention shown in Fig. 2 of the drawing, there is provided an interrupting device which is also completely enclosed like the device shown in Fig. 1. The enclosure includes a tube 18 preferably of an insulating material like tube 2 of Fig. 1, and within the tube there is provided a rod-like conducting member 20. The conducting rod 20 is provided with spaced fusible sections 26 of reduced cross section, and the ends of the rod 24 and the portions 22 thereof intermediate fusible sections 26 are threaded for receiving end caps 28 and partition members 27. As shown, partition members 27 are of a size to tightly fit within tube 18 and are preferably located substantially intermediate fusible sections 26. When the rod is assembled, split spacing sleeves 30, similar to spacing rings 17 shown in Fig. 1, are provided between partitions 27 and between these partitions and the ends of the tube, for maintaining the partitions in the relative positions shown even after fusible sections 26 have melted. End caps 28 threadedly engage the outer ends of insulating tube 18, and are provided with a central threaded aperture for cooperation with the threaded ends of conducting rod 20 to form tight closures for the ends of the tube.

The operation of the fuse shown in Fig. 2 is substantially identical with that previously described in connection with Fig. 1 and, therefore, will not be described in detail. However, the same results are obtainable with the fuse shown in Fig. 2 as with that shown in Fig. 1, because it will be noted that when fusible sections 26 melt, each arc will be entirely confined to permit the building up of a pressure to act on the positive column of the arc to increase its voltage drop. Moreover, rod 20 is preferably of a cold cathode material like conducting rod 4 of Fig. 1, so that the cathode drop is also increased to the point where this fuse is easily capable of interrupting the high currents encountered in the protection of network cable insulation. Partitions 27 shown in Fig. 2 may be of any desired material either metal or insulation material, it being required only that they have the requisite mechanical strength to prevent flashover or leakage between the several arc chambers.

A further advantage of this fuse lies in the fact that its high voltage drop limits the current in the circuit. Immediately after the fuse blows, the current is limited to a much smaller value than the normal short circuit current. This has the beneficial effect of changing the power factor of the circuit and causing it to approach unity. Obviously, this makes interruption of the circuit easier for the fuse in that the rate of rise of recovery voltage is much smaller, and in addition, it has the beneficial effect that surges due to interruption, are far less than they are with a normal fuse which does not limit the current.

In the foregoing, there has been particularly described a relatively simplified circuit interrupting device in the nature of a fuse, but which because of the special construction thereof is capable of interrupting currents much above the interrupting capabilities of an ordinary fuse, and without any external display whatsoever. Not only is the interrupter comprising this invention capable of interrupting large values of current, but one reason that it is able to do this is because the fusible portions thereof are intended to be fused only on currents much higher than any ordinary overload currents which may be encountered on the system, that is, currents on the order of 1,000 amperes or higher. This, of course, requires that relatively massive fusible sections be employed which, in turn, serve to provide the relatively high pressure required to increase the voltage drop of the positive column of the arc, all as stated above.

Having described preferred embodiments of the invention in accordance with the patent statutes, it is desired that the invention be not limited to the specific embodiments herein disclosed inasmuch as it will be obvious to persons skilled in the art that many modifications and changes may be made without departing from the broad spirit and scope of the invention. Therefore, it is requested that the invention be interpreted as broadly as possible and that it be limited only as required by the prior art.

We claim as our invention:

1. In a high current circuit interrupting device, an enclosure capable of withstanding high pressures, spaced terminals associated with said enclosure, a unitary member of fusible material connected between said terminals, said member having alternate portions of large and small cross-sectional area, insulating spacer means between said portions of large cross-sectional area, and said portions of large cross-sectional area being of a size to snugly fit the walls of said enclosure to provide partitions between said sections of small cross-sectional area.

2. In a high current crcuit interrupting device, an enclosure capable of withstanding high pressures, spaced terminals associated with said enclosure, a unitary member of fusible material connected between said terminals, said member having alternate portions of large and small cross-sectional area, and partition means for said enclosure adjustably threadedly mounted on said portions of large cross-sectional area.

3. In a circuit interrupter, a tubular enclosure having end walls, spaced terminals for said enclosure, conducting means in said enclosure connected between said terminals, said conducting means including fusible portions spaced along said enclosure, at least one partition wall in said enclosure mounted on said conducting means intermediate said fusible portions, and spacer means positioned in said enclosure in the spaces between said walls for preventing movement of said partition wall after fusion of said fusible portions.

4. In a circuit interrupter, a tubular enclosure, spaced terminals for said enclosure, conducting means adapted to be inserted in said enclosure through one end thereof and to be connected between said terminals, said conducting means including spaced fusible portions, partition means mounted on said conducting means intermediate said fusible portions and of substantially the same size and shape as the interior of said enclosure, and tubular spacer means on said conducting means for preventing movement of said partition means after fusion of said fusible portions and insertable into said enclosure with said conducting means.

5. In a circuit interrupter, a tubular enclosure having end walls, spaced terminals for said enclosure, conducting means in said enclosure connected between said terminals, said conducting means including fusible portions spaced along said enclosure, at least one partition wall of conducting material in said enclosure mounted on said conducting means intermediate said fusible portions, and spacer means of insulating material positioned in said enclosure in the spaces between said walls for preventing movement of said partition means after fusion of said fusible portions.

LEON R. LUDWIG.
PAUL O. LANGGUTH.